United States Patent [19]

Limberg

[11] Patent Number: 5,748,226
[45] Date of Patent: May 5, 1998

[54] DIGITAL TELEVISION RECEIVER WITH ADAPTIVE FILTER CIRCUITRY FOR SUPPRESSING NTSC CO-CHANNEL INTERFERENCE

[75] Inventor: Allen LeRoy Limberg, Vienna, Va.

[73] Assignee: Samsung Electronics Co., Ltd., Suwon, Rep. of Korea

[21] Appl. No.: 746,520

[22] Filed: Nov. 12, 1996

[51] Int. Cl.$^6$ ...................................................... H04N 5/38
[52] U.S. Cl. ............................ 348/21; 348/470; 348/725; 348/607
[58] Field of Search ........................ 348/21, 607, 611, 348/613, 465, 725, 470; 375/251, 350, 261, 345, 346

[56] References Cited

U.S. PATENT DOCUMENTS

| 5,087,975 | 2/1992 | Citta et al. | 358/183 |
|---|---|---|---|
| 5,151,785 | 9/1992 | Citta | 358/141 |
| 5,260,793 | 11/1993 | Citta et al. | 358/167 |
| 5,325,204 | 6/1994 | Scarpa | 348/607 |
| 5,508,752 | 4/1996 | Kim et al. | 348/608 |
| 5,546,132 | 8/1996 | Kim et al. | 348/607 |
| 5,602,583 | 2/1997 | Citta | 348/21 |
| 5,648,822 | 7/1997 | Hulyalkar | 348/21 |

*Primary Examiner*—Victor R. Kostak

[57] ABSTRACT

Co-channel interference accompanying multiple-level symbols in a digital receiver, such as a digital television receiver, is suppressed by using a first comb filter to reduce the energy of the co-channel interference before data slicing. The first comb filter incidentally carries out a symbol re-coding procedure of first type that introduces error into the symbol decoding results generated by the data slicing. A second comb filter carries out a symbol re-coding procedure of second type after the data slicing to compensate for the symbol re-coding procedure of first type and generate corrected symbol decoding results. The symbol re-coding procedure of first type re-codes an input symbol stream through differential delay and first linear combination of the differentially delayed terms. The symbol re-coding procedure of second type re-codes the symbol stream recovered by data slicing, through second linear combination of the symbol stream with delayed result of the second linear combination, and is performed in accordance with a modular arithmetic. One of the first and second linear combinations is subtractive, and the other is additive. The results of the second linear combination are the corrected symbol decoding results.

31 Claims, 4 Drawing Sheets

ONE OF 1ST & 2ND LINEAR COMBINERS IS A SUBTRACTOR & THE OTHER IS AN ADDER

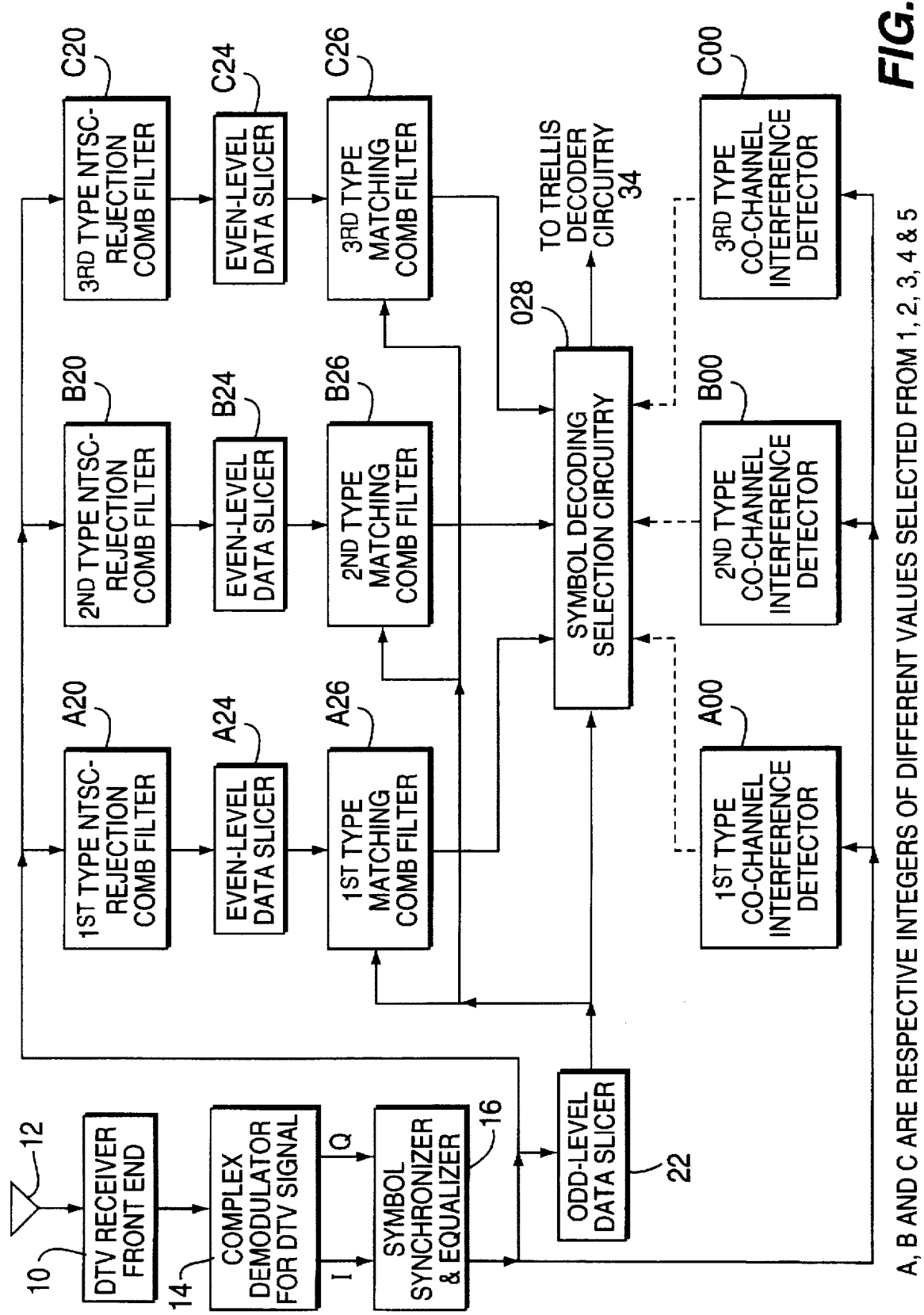

DIGITAL TELEVISION RECEIVER WITH ADAPTIVE FILTER CIRCUITRY FOR SUPPRESSING NTSC CO-CHANNEL INTERFERENCE

The present invention relates to digital television systems, such as the digital high-definition television (HDTV) system used for terrestrial broadcasting in the United States of America in accordance with the Advanced Television Sub-Committee (ATSC) standard, and more particularly, to digital television receivers with adaptive filter circuitry for suppressing co-channel interference from analog television signals, such as those conforming to the National Television Systems Committee (NTSC) standard.

BACKGROUND OF THE INVENTION

The standard for digital HDTV signal terrestrial broadcasting in the United States of America is capable of accommodating the transmission of other digital television (DTV) formats, such as the parallel transmission of four television signals having normal definition in comparison to an NTSC analog television signal. DTV transmitted by vestigial-sideband (VSB) amplitude modulation (AM) during terrestrial broadcasting in the United States of America comprises a succession of consecutive-in-time data fields each containing 313 consecutive-in-time data segments. Each segment of data is preceded by a line synchronization code group of four symbols having successive values of +S, −S, −S and +S. The value +S is one level below the maximum positive data excursion, and the value −S is one level above the maximum negative data excursion. The segments of data are each of 77.3 microsecond duration, and there are 832 symbols per data segment for a symbol rate of about 10 MHz. The initial line of each data field is a field synchronization code group that codes a training signal for channel-equalization and multipath suppression procedures. The training signal is a 511-sample pseudo-noise sequence (or "PN-sequence") followed by three 63-sample PN sequences. This training signal is transmitted in accordance with a first logic convention in the first line of each odd-numbered data field and in accordance with a second logic convention in the first line of each even-numbered data field, the first and second logic conventions being one's complementary respective to each other.

The data within data lines are trellis coded using twelve interleaved trellis codes, each a ⅔ rate trellis code with one uncoded bit. The interleaved trellis codes are subjected to Reed-Solomon forward error-correction coding, which provides for correction of burst errors arising from noise sources such as a nearby unshielded automobile ignition system. The Reed-Solomon coding results are transmitted as 8-level (3 bits/symbol) one-dimensional-constellation symbol coding for over-the-air transmission, which transmissions are made without symbol precoding separate from the trellis coding procedure. The Reed-Solomon coding results are transmitted as 16-level (4 bits/symbol) one-dimensional-constellation symbol coding for cablecast, which transmissions are made without precoding. The VSB signals have their natural carrier wave, which would vary in amplitude depending on the percentage of modulation, suppressed.

The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 4-bit symbol coding have normalized values of −7, −5, −3,−1, +1, +3, +5 and +7 in the carrier modulating signal, the pilot carrier has a normalized vale of 1.25. The normalized value of +S is +5, and the normalized value of -S is −5.

In the earlier development of the DVT art it was contemplated that the DTV broadcaster might be called upon to decide whether or not to use a symbol precoder at the transmitter, which symbol precoder would follow the symbol generation circuitry and provide for matched filtering of symbols, when used together with a comb filter in each DTV receiver used before the data-slicer in the symbol decoder circuitry as a symbol post-coder. This decision would have depended upon whether interference from a co-channel NTSC broadcasting station were expected or not. Symbol precoding would not have been used for data line synchronization code groups or during data lines in which data field synchronization data were transmitted. Co-channel interference is reduced at greater distances from the NTSC broadcasting station(s) and is more likely to occur when certain ionospheric conditions obtain, the summertime months during years of high solar activity being notorious for likelihood of co-channel interference. Such interference will not obtain if there are no co-channel NTSC broadcasting stations, of course. If there were likelihood of NTSC interference within his area of broadcast coverage, it was presumed that the HDTV broadcaster would use the symbol precoder to facilitate the HDTV signal being more easily separated from NTSC interference; and, accordingly, a comb filter would be employed as symbol post-coder in the DTV receiver to complete matched filtering. If there were no possibility of NTSC interference or there were insubstantial likelihood thereof, in order that flat spectrum noise would be less likely to cause erroneous decisions as to symbol values in the trellis decoder, it was presumed that the DTV broadcaster would discontinue using the symbol precoder; and, accordingly, the symbol post-coder would then be disabled in each DTV receiver.

U.S. Pat. No. 5,260,793 issued 9 Nov. 1993 to R. W. Citta et alii and entitled "RECEIVER POST CODER SELECTION CIRCUIT" selectively employs a comb filter as a symbol post-coder for suppressing NTSC interference accompanying a real or in-phase baseband component (I channel) of the complex output signal of a demodulator used in a digital high-definition television (HDTV) receiver. The presence of NTSC interference in the I-channel component of the demodulator response is detected for developing control signals automatically to enable or disable the comb filter being used for suppressing NTSC co-channel interference. During each data field sync interval, the input signal to and the output signal from an NTSC suppression filter of comb filter type in the HDTV receiver are each compared with a respective signal that is known a priori and is drawn from memory within the HDTV receiver. If the minimum result of comparison with the input signal has less energy than the minimum result of comparison with the output signal from the NTSC suppression filter, this is indicative that the primary cause of variance from expected reception is random noise rather than NTSC co-channel interference. Insofar as the particular digital television receiver is concerned, reception would be better were precoding and post-coding not employed in the system, and it is presumed that the broadcaster has not employed precoding. If the minimum result of comparison with the input signal has more energy than the minimum result of comparison with the output signal from the NTSC suppression filter, this is indicative that the primary cause of variance from expected reception is NTSC co-channel interference rather than random noise. Insofar as the particular digital television receiver is concerned, reception would be better were precoding and post-coding employed in the system, and it is presumed that the broadcaster has employed precoding.

In the automatic symbol post-coder selection circuitry described in U.S. Pat. No. 5,260,793 applications, symbol post-coding is enabled during times when substantial co-channel NTSC interference is detected at the receiver and is otherwise disabled, without regard to whether the broadcaster employs precoding or not. This undesirably would lead to errors in trellis decoding results when the broadcaster did not employ the symbol precoder, but actual co-channel NTSC interference is substantial. These errors would have required that an over-ride of the automatic symbol post-coder selection circuitry be provided for actuation by the human being viewing the DTV receiver. Actual co-channel NTSC interference can be substantial for portions of the reception area for a broadcast without the broadcaster being aware of the condition, owing to freakish skip conditions, owing to cablecast leakage, owing to inadequate intermediate-frequency image suppression in NTSC receivers, owing to magnetic tape used for digital television recording having remnant previous analog television recording, or owing to some other unusual condition.

If there were to be selective employment of symbol precoding by the transmitter, it would be desirable that the use or non-use of symbol precoding by the transmitter be signaled, so that erroneous selection by the automatic post-coder selection circuitry could be avoided. The use or non-use of precoding by the transmitter could be signaled in the data lines used for field sync. Alternatively, the use or non-use of precoding by the transmitter could be signaled in the packet header information for each data packet. Signaling the use or non-use of precoding by the transmitter in the data lines used for field sync is advantageous over signaling in other data lines, in that the signaling is not affected by the use or non-use of post-coding by the digital television receiver. Currently, however, the digital television standard does not authorize the transmitter to use symbol precoding or to signal the use of symbol precoding.

The current ATSC DTV standard presumes that the suppression of co-channel interfering analog TV signal will be carried out in the trellis decoding process, after the data-slicing procedures associated with symbol decoding. This procedure avoids the problems alluded to above. However, co-channel interfering analog TV signal undesirably introduces errors into the data-slicing processes, which places more burden on the error-correction decoding procedures, trellis decoding and Reed-Solomon decoding. These errors will reduce the broadcast coverage area, which may lose revenue for the commercial DTV broadcaster. So, providing for the suppression of co-channel interfering analog TV signal before data-slicing is still desirable, despite symbol precoding at the DTV transmitter not being authorized by the current ATSC DTV standard.

The term "linear combination" in this specification and the claims appended thereto refers generically to addition and to subtraction, whether performed in accordance with a conventional arithmetic or a modular arithmetic. The term "modular combination" in this specification and the claims appended thereto refers to linear combination carried performed in accordance with a modular arithmetic. That type of coding that re-codes a digital symbol stream through differential delay and linear combination of the differentially delayed terms, exemplified by the symbol post-coding used in prior-art HDTV receivers, is defined as "symbol re-coding of first type" in this specification and the claims appended hereto. That type of coding that re-codes a digital symbol stream through its modular combination with delayed result of the modular combination, exemplified by the symbol pre-coding used in prior-art HDTV transmitters, is defined as "symbol re-coding of second type" in this specification and the claims appended hereto.

The problem of co-channel interference from analog television signals is viewed in this specification more from the standpoint of being a sometime jamming problem at the receiver, to be solved by adaptive filter circuitry in the receiver, than has been the case in the prior art. So long as the dynamic range of the system channel is not exceeded, so that the co-channel interference can capture the system channel by destroying signal transmission capability for DTV modulation, the performance of the system can be viewed as a superposition of signals problem. The filter circuitry in the receiver is adapted for selecting the digital signal from the co-channel interference caused by the analog television signals, relying on the pronounced correlation and anti-correlation properties of the analog television signals to reduce their energy sufficiently as to capture the system channel from them.

Insofar as the co-channel interference from analog television signals is concerned, it enters the system channel after the DTV transmitter and before the DTV receiver. The use or non-use of symbol precoding at the DTV transmitter has no effect on the co-channel interference from analog television signals. At the DTV receiver, so long as the co-channel interference is not so large as to overload the receiver front-end and capture the system channel, it is advantageous to precede the data slicing circuitry with a comb filter for reducing the energy of higher-energy spectral components of the co-channel interference, thus to reduce the errors occurring during data slicing. The DTV broadcaster should adjust his carrier frequency, which is nominally 310 KHz above the lower limit frequency of the television channel assignment, so that his carrier frequency is optimally offset in frequency from the video carrier of a co-channel NTSC analog TV signal that is likely to interfere. This optimal offset in carrier frequency is exactly 59.75 times the horizontal scan line frequency $f_H$ of the NTSC analog TV signal. The artifacts of the co-channel interference in the demodulated DTV signal will then include beats at 59.75 times the horizontal scan line frequency $f_H$ of the NTSC analog TV signal, generated by heterodyne between the digital HDTV carrier and the video carrier of the co-channel interfering analog TV signal, and beats at 287.25 times $f_H$, generated by heterodyne between the digital HDTV carrier and the chrominance subcarrier of the co-channel interfering analog TV signal, which beats are quite close in frequency to the fifth harmonic of the beats at 59.75 times $f_H$. The artifacts will further include beats at approximately 345.75 times $f_H$, generated by heterodyne between the digital HDTV carrier and the audio carrier of the co-channel interfering analog TV signal, which beats are quite close in frequency to the sixth harmonic of the beats at 59.75 times $f_H$. The nearly harmonic relationship of these beats allows them all to be suppressed by a single properly designed comb filter incorporating only a few symbol epochs of differential delay. The use of an NTSC-rejection comb filter before data slicing incidentally introduces symbol re-coding of first type.

The data-slicing operation that follows first symbol re-coding in the DTV receiver is a quantizing process that is not destructive of the symbols resulting from the symbol re-coding of first type, insofar as the transmission of data is concerned, since the data quantization levels are designed to match the symbol levels. The quantization discriminates against the co-channel interfering analog TV signal remnants that remain after the filtering associated with symbol re-coding of first type and that are appreciably smaller than steps between symbol code levels, however. This is a species of the capture phenomenon in which phenomenon a stronger signal gains at the expense of a weaker one in a quantizing process Insofar as the transmission of data is concerned, the digital data symbol stream flows through the full length of the system channel. When symbol re-coding of second type is done as symbol precoding at the DTV transmitter, the additive combination of the differentially delayed data symbol streams is done on a modular basis that does not boost transmitter power or increase average intersymbol distance to help further in overcoming jamming analog TV signal. Instead, the principal mechanism for overcoming jamming analog TV signal is its attenuation vis-a-vis DTV signal, as provided by the comb filtering at the DTV receiver, causing the remnant analog TV signal in the comb filter response to be suppressed by the quantizing effects in the data slicer that immediately follows the comb filter.

The order of performing symbol re-coding procedures of first and second types has no appreciable affect on signal transmission through the system channel under such circumstances, the inventor points out, since neither coding scheme destroys signal transmission capability for the symbol stream. The order of performing symbol re-coding procedures of first and second types has no appreciable affect on the capability of the digital receiver to suppress co-channel interfering analog TV signal, as long as symbol re-coding of the second type is not interposed between symbol re-coding of the first type and the subsequent data-slicing. This insight provides the foundation on which the invention is based.

SUMMARY OF THE INVENTION

The invention is directed to the suppression of co-channel interference accompanying multiple-level symbols in a digital receiver, such as a digital television receiver, by using a first comb filter to reduce the energy of the co-channel interference before data slicing. The first comb filter incidentally carries out a symbol re-coding procedure of first type that introduces error into the symbol decoding results generated by the data slicing. A second comb filter carries out a symbol re-coding procedure of second type after the data slicing, to compensate for the symbol re-coding procedure of first type and generate corrected symbol decoding results. The symbol re-coding procedure of first type re-codes an input symbol stream through differential delay and first linear combination of the differentially delayed terms. The symbol re-coding procedure of second type re-codes the symbol stream recovered by data slicing, through second linear combination of the symbol stream with delayed result of the second linear combination, and is performed in accordance with a modular arithmetic. The first linear combination is additive, and the second linear combination is subtractive. The results of the second linear combination are the corrected symbol decoding results.

An aspect of the invention is a method of symbol decoding a stream of 2N-level symbols each having a symbol epoch of a specified length in time, which stream of 2N-level symbols is susceptible to being accompanied by artifacts of co-channel interfering analog television signal. This method of symbol decoding generates final symbol decoding results and comprises steps as follow. The stream of 2N-level symbols is comb filtered to generate a comb filter response with (4N−1)-level symbols from which any said artifacts of co-channel interfering analog television signal are suppressed. This step of comb filtering is accomplished by delaying the stream of 2N-level symbols by a prescribed number of symbol epochs to generate a delayed stream of 2N-level symbols, then linearly combining the stream of 2N-level symbols and the delayed stream of 2N-level symbols to generate first linear combining results as the comb filter response with (4N−1)-level symbols. The linear combining in this step of comb filtering is an additive procedure. The stream of 2N-level symbols is data-sliced to generate interim symbol decoding results, and the comb filter response with (4N−1)-level symbols is data-sliced to generate supplemental symbol decoding results. Selected symbol decoding results are delayed by a prescribed number of said symbol epochs to generate delayed selected symbol decoding results and are linearly combined with the supplemental symbol decoding results to generate second linear combining results. This latter step of linearly combining is a subtractive procedure since the linearly combining in the earlier step of comb filtering is an additive procedure. The interim symbol decoding results are selected to be the selected symbol decoding results at prescribed times and otherwise the second linear combining results are selected to be the selected symbol decoding results. When the stream of 2N-level symbols is determined to be currently accompanied by artifacts of co-channel interfering analog television signal of sufficient strength that the selected symbol decoding results are less likely to be in error than the interim symbol decoding results, the selected symbol decoding results are chosen as the final decoding results. When the stream of 2N-level symbols is determined not to be currently accompanied by artifacts of co-channel interfering analog television signal of sufficient strength that the selected symbol decoding results are less likely to be in error than the interim symbol decoding results, the interim symbol decoding results are chosen as said final decoding results.

A further aspect of the invention is embodied in a digital receiver, such as a digital television receiver, using a plurality of data slicers, each data slicer preceded by a different type of comb filter for reducing co-channel interference from an analog television signal, and each data slicer succeeded by a comb filter complementary to the comb filter preceding the data slicer for generating an estimate of correct symbol decoding result. Voting circuitry selects one of these estimates as a best estimate to be supplied as input signal to trellis decoder circuitry in the digital receiver.

BRIEF DESCRIPTION OF THE DRAWING

FIG. 7 is a block schematic diagram of a digital television signal receiver constructed in accordance with a further aspect of the invention so as to utilize a plurality of symbol decoders operated in parallel, each preceded by a respective NTSC-rejection comb filter and succeeded by a matching comb filter, with the best estimate of correct symbol decoding being supplied to trellis decoding circuitry.

DETAILED DESCRIPTION

Figure 1:
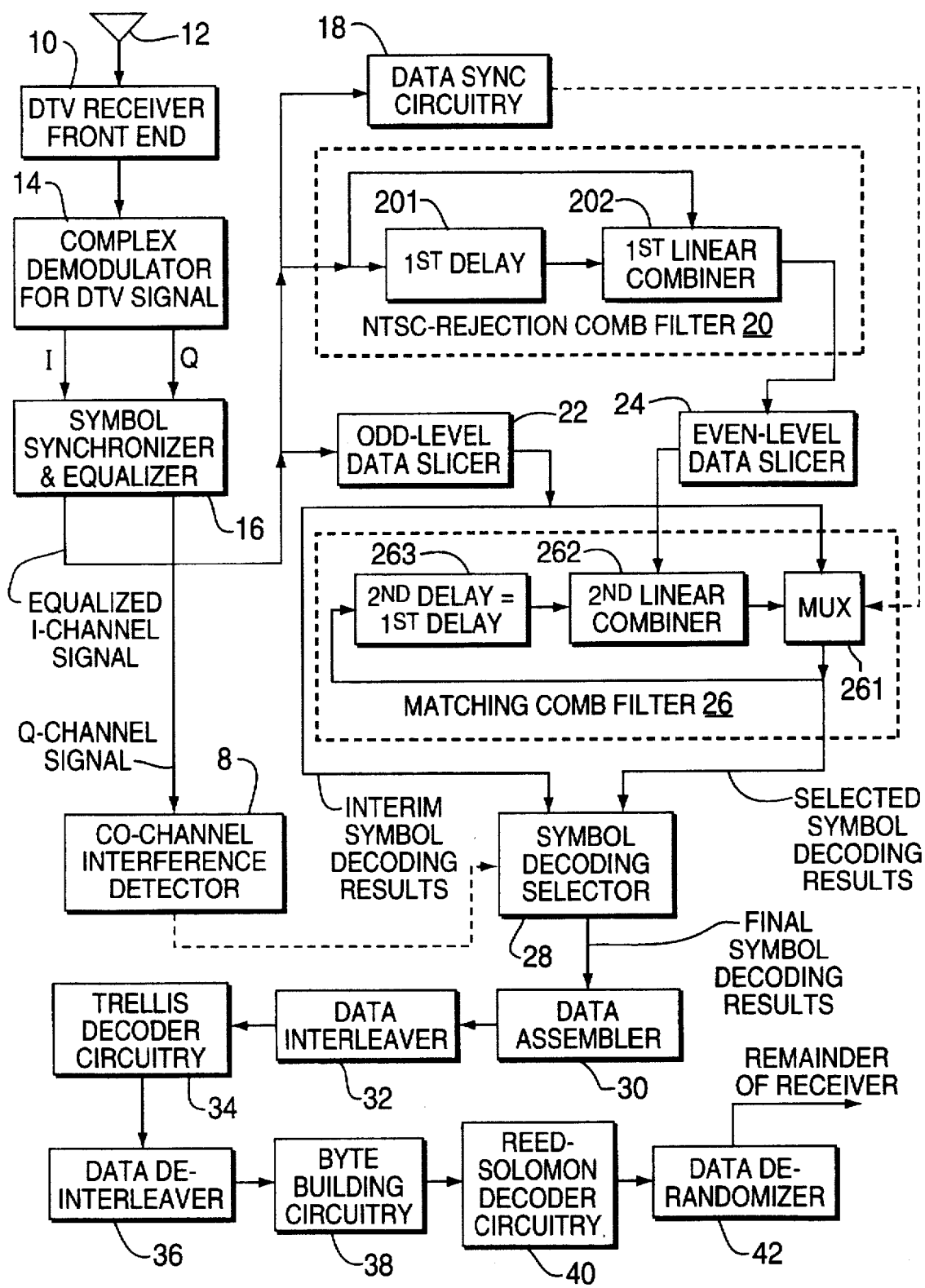
FIG. 1 is a block schematic diagram of a digital television signal receiver using an NTSC-rejection comb filter before symbol decoding and a matching comb filter after symbol decoding, in accordance with the invention, and using a co-channel interference detector of the type described in U.S. Pat. No. 5,260,793.

FIG. 1 shows a digital television signal receiver used for recovering error-collected data, which data are suitable for recording by a digital video cassette recorder or for MPEG-2 decoding and display in a television set. The FIG. 1 DTV signal receiver includes the "front end" electronics 10 including tuner and intermediate-frequency (I-F) amplifiers, shown as receiving broadcast DTV signals from an antenna 12. The "front end" electronics 10 preferably are of plural-conversion type including intermediate-frequency amplifiers at more than one intermediate-frequency band. Preferably, a surface-acoustic-wave (SAW) filter is used in at least one intermediate-frequency band to shape channel selection response and reject adjacent channels. This SAW filter cuts off rapidly just beyond 5.38 MHz remove from the suppressed carrier frequency and the pilot carrier, which is of like frequency and of fixed amplitude. This SAW filter accordingly rejects the frequency modulated sound carrier of any co-channel interfering analog TV signal. The sound carrier frequency is 5.75 MHz from the lowest frequency limit of the TV channel and has maximum ±40 kHz frequency swing.

The sound carrier of any co-channel interfering analog TV signal can also be trap filtered in the "front end" electronics 10. For example, a SAW filter can be used to select the frequency-modulated sound carrier of any co-channel interfering analog TV signal from an I-F signal, and the SAW filter response can be destructively combined with that I-F signal to generate I-F signal substantially free from frequency-modulated sound carrier of any co-channel interfering analog TV signal. Removing the FM sound carrier of any co-channel interfering analog TV signal in the "front end" electronics 10 prevents artifacts therefrom being generated when the final I-F signal is detected to recover baseband symbols and forestalls such artifacts interfering with data-slicing of those baseband symbols during symbol decoding. The prevention of such artifacts interfering with data-slicing of those baseband symbols during symbol decoding is better than can be accomplished by relying on comb-filtering before data-slicing.

The final I-F output signals from the "front end" electronics 10 are supplied to a complex demodulator 14, which demodulates the vestigial-sideband amplitude-modulation DTV signal in the final intermediate-frequency band to recover a real baseband signal and an imaginary baseband signal. Demodulation may be done in the digital regime after analog-to-digital conversion of a final intermediate-frequency band in the few megacycle range as described for example by C. B. Patel et alii in U.S. Pat. No. 5,479,449 issued 26 Dec. 1995 and entitled "DIGITAL VSB DETECTOR WITH PHASE TRACKER, AS FOR INCLUSION IN AN HDTV RECEIVER". Alternatively, demodulation may be done in the analog regime, in which case the results are usually subjected to analog-to-digital conversion to facilitate further processing. The digital results of such demodulation procedures conventionally have 8-bit accuracy or more and describe 2N-level symbols that encode N bits of data. Currently, 2N is eight in the case where the FIG. 1 DTV signal receiver receives a through-the-air broadcast via the antenna 12 and is sixteen in the case where the FIG. 1 DTV signal receiver receives cablecast. The concern of the invention is with the reception of terrestrial through-the-air broadcasts, and FIG. 1 does not show the portions of the DTV receiver providing symbol decoding and error-correction decoding for received cablecast transmissions.

Symbol synchronizer and equalizer circuitry 16 receives at least the digitized real baseband signal from the complex demodulator 14; in the FIG. 1 DTV receiver the circuitry 16 is shown also receiving the digitized imaginary baseband signal. The circuitry 16 includes a digital filter with adjustable weighting coefficients that compensates for ghosts and tilt in the received signal. The symbol synchronizer and equalizer circuitry 16 provides symbol synchronization or "de-rotation" as well as amplitude equalization and ghost removal. Symbol synchronizer and equalizer circuitry in which symbol synchronization is accomplished before amplitude equalization is known from U.S. Pat. No. 5,479,449. In such designs the demodulator 14 will supply oversampled demodulator response containing real and imaginary baseband signals to the symbol synchronizer and equalizer circuitry 16. After symbol synchronization, the oversampled data are decimated to extract baseband I-channel signal at normal symbol rate, to reduce sample rate through the digital filtering used for amplitude equalization and ghost removal. Symbol synchronizer and equalizer circuitry in which amplitude equalization precedes symbol synchronization, "de-rotation" or "phase tracking" is also known to those skilled in the art of digital signal receiver design.

Each sample of the circuitry 16 output signal is resolved to ten or more bits and is, in effect, a digital description of an analog symbol exhibiting one of (2N=8) levels. The circuitry 16 output signal is carefully gain-controlled by any one of several known methods, so the ideal step levels for symbols are known. One method of gain control, preferred because the speed of response of such gain control is exceptionally rapid, regulates the direct component of the real baseband signal supplied from the complex demodulator 14 to a normalized level of +1.25. This method of gain control is generally described in U.S. Pat. No. 5,479,449 and is more specifically described by C. B. Patel et alii in U.S. patent application Ser. No. 5,573,454 filed 15 Dec. 1995 and entitled "AUTOMATIC GAIN CONTROL OF RADIO RECEIVER FOR RECEIVING DIGITAL HIGH-DEFINITION TELEVISION SIGNALS".

The output signal from the circuitry 16 is supplied as input signal to data sync circuitry 18, which recovers data field synchronization and data line synchronization information from the equalized baseband I-channel signal. Alternatively, the input signal to data sync circuitry 18 can be obtained prior to equalization. The data sync circuitry 18 is of interest in regard to the invention because it also supplies one or more multiplexer control signals each having two states, each multiplexer control signal a first of those two states at selected times, but otherwise exhibiting a second of those two states.

The equalized I-channel signal samples at normal symbol rate supplied as output signal from the circuitry 16 are applied as the input signal to an NTSC-rejection comb filter 20. The comb filter 20 includes a first delay device 201 to generate a pair of differentially delayed streams of the 2N-level symbols and a first linear combiner 202 for linearly combining the differentially delayed symbol streams to generate the comb filter 20 response. As described in U.S. Pat. No. 5,260,793, the first delay device 201 can provide a delay equal to the period of twelve 2N-level symbols, and the first linear combiner 202 can be a subtractor. Each sample of the comb filter 20 output signal is resolved to ten or more bits and is, in effect, a digital description of an analog symbol exhibiting one of (4N−1)=15 levels.

The symbol synchronizer and equalizer circuitry 16 is presumed be designed to suppress the direct bias component of its input signal (as expressed in digital samples), which direct bias component has a normalized level of +1.25 and appears in the real baseband signal supplied from the complex demodulator 14 owing to detection of the pilot carrier. Accordingly, each sample of the circuitry 16 output signal applied as comb filter 20 input signal is, in effect, a digital description of an analog symbol exhibiting one of the following normalized levels: −7, −5,−3, −1, +3, +5 and +7. These symbol levels are denominated as "odd" symbol levels and are detected by an odd-level data slicer 22 to generate interim symbol decoding results of 000, 001, 010, 011, 100, 101, 110 and 111, respectively.

Each sample of the comb filter 20 output signal is, in effect, a digital description of an analog symbol exhibiting one of the following normalized levels: −14, −12, −10, −8, −6, −4, −2, 0, +2, +4, +6, +8, +10, +12 and +14. These symbol levels are denominated as "even" symbol levels and are detected by an even-level data slicer 24 to generate supplementary symbol decoding results of 001, 010, 011, 100, 101, 110, 111, 000, 001, 010, 011, 100, 101, 110, and 111, respectively.

A comb filter 26 is used after the data slicers 22 and 24 to generate a matching filter response to the response of the comb filter 20 insofar as symbols are concerned. The comb filter 26 includes a 2-input multiplexer 261, a second linear combiner 262, and a second delay device 263 with delay equal to that of the first delay device 201 in the comb filter 20. The second linear combiner 262 is a modulo-8 adder if the first linear combiner 202 is a subtractor and is a modulo-8 subtractor if the first linear combiner 202 is an adder. The first linear combiner 202 and the second linear combiner 262 may be constructed as respective read-only memories (ROMs) to speed up linear combination operations sufficiently to support the sample rates involved.

The output signal of the multiplexer 261 reproduces one of the two input signals applied to the multiplexer 261, as controlled by a respective multiplexer control signal supplied to the multiplexer 261 from the data sync circuitry 18. The first input signal to the multiplexer 261 corresponds to the interim symbol decoding results supplied from the odd-level data slicer 22, and the multiplexer 261 is conditioned by its respective multiplexer control signal the being in the first of its two states to reproduce the interim symbol decoding results as its output signal. The second input signal to the multiplexer 261 corresponds to second linear combining results supplied from a second linear combiner 262, and the multiplexer 261 is conditioned by its respective multiplexer control signal the being in the second of its two states to reproduce the second linear combining results as its output signal. The output signal from the multiplexer 261 furnishes the response from the matching comb filter 26 and is delayed by the second delay device 263. The second linear combiner 262 combines the supplementary symbol decoding results from the even-level data slicer 24 with the output signal from the second delay device 263.

The FIG. 1 DTV receiver uses a co-channel interference detector 4 of the general type described in U.S. Pat. No. 5,260,793. During each data field sync interval, the co-channel interference detector 4 compares both the input signal to and the output signal from the comb filter 20 with a respective signal that is known a priori and is drawn from memory within the DTV receiver. If the minimum result of comparison with the input signal to the comb filter 20 has less energy than the minimum result of comparison with the output signal from the comb filter 20, the co-channel interference detector 4 output signal is in a first of its two possible states, which first state is indicative that the primary cause of variance from expected reception is random noise rather than NTSC co-channel interference. This first state of the co-channel interference detector 4 output signal conditions the selector 28 to reproduce, as its output signal, the interim symbol decoding results from the odd-level data slicer 22. If the minimum result of comparison with the input signal to the comb filter 20 has more energy than the minimum result of comparison with the output signal from the comb filter 20, the co-channel interference controller 4 output signal is in a second of its two possible states, which second state is indicative that the primary cause of variance from expected reception is NTSC co-channel interference rather than random noise. This first state of the co-channel interference detector 4 output signal conditions the selector 28 to reproduce the comb filter 26 response as its output signal.

The output signal from the symbol decoding selector 28 comprises the final symbol decoding results in 3-parallel-bit groups, assembled by a data assembler 30 for application to a data interleaver 32. The data interleaver 32 commutates the assembled data into parallel data streams for application to trellis decoder circuitry 34. Trellis decoder circuitry 34 conventionally uses twelve trellis decoders. The trellis decoding results are supplied from the trellis decoder circuitry 34 to data de-interleaver circuitry 36 for de-commutation. Byte parsing circuitry 38 converts the data interleaver 36 output signal into bytes of Reed-Solomon error-correction coding for application to Reed-Solomon decoder circuitry 40, which performs Reed-Solomon decoding to generate an error-corrected byte stream supplied to a data de-randomizer 42. The data de-randomizer 42 supplies reproduced data to the remainder of the receiver (not shown). The remainder of a complete DTV receiver will include a packet sorter, an audio decoder, an MPEG-2 decoder and so forth. The remainder of a DTV receiver incorporated in a digital tape recorder/reproducer will include circuitry for converting the data to a form for recording.

The symbol synchronizer and equalizer circuitry 16 is presumed in the foregoing description to be designed to suppress the direct bias component of its input signal (as expressed in digital samples), which direct bias component has a normalized level of +1.25 and appears in the real baseband signal supplied from the complex demodulator 14 owing to detection of the pilot carrier. Alternatively, the symbol synchronizer and equalizer circuitry 16 is designed to preserve the direct bias component of its input signal, which simplifies the design of the equalization filter in the circuitry 16 somewhat. In such case the data-slicing levels in the odd-level data slicer 22 are offset to take into account the direct bias component accompanying the data steps in its input signal. Providing that the first linear combiner 202 is a subtractor, whether the circuitry 16 is designed to suppress or to preserve the direct bias component of its input signal has no consequence in regard to the data-slicing levels in the even-level data slicer 24. However, if the differential delay provided by the first delay device 201 is chosen so that the first linear combiner 202 is an adder, the data-slicing levels in the even-level data slicer 24 should be offset to take into account the doubled direct bias component accompanying the data steps in its input signal.

Arrangements are possible in which one data slicer replaces the odd-level data slicer 22 and the even-level data slicer 24 with a single data slicer, using multiplexer connections to shift its place in circuit and to provide bias to modify its slicing ranges, but these arrangements are not preferred because of the complexity of operation.

Figure 2:
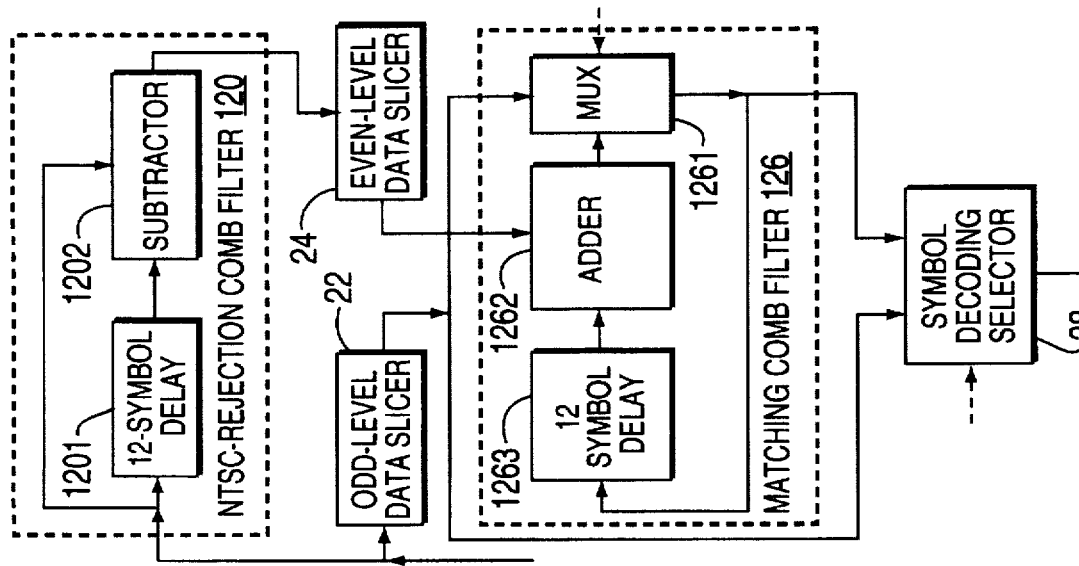
FIG. 2 is a block schematic diagram showing details of a portion of the FIG. 1 digital television signal receiver when the NTSC-rejection comb filter employs a 12-symbol delay.

FIG. 2 is a block schematic diagram showing details of a portion of the FIG. 1 digital television signal receiver using a species 120 of the NTSC-rejection comb filter 20 and a species 126 of the matching comb filter 26. A subtractor 1202 serves as the first linear combiner in the NTSC-rejection comb filter 120, and a modulo-8 adder 1262 serves as the second linear combiner in the matching comb filter 126. The NTSC-rejection comb filter 120 uses a first delay device 1201 exhibiting a delay of twelve symbol epochs, and the matching comb filter 126 uses a second delay device 1263 also exhibiting a delay of twelve symbol epochs. The 12-symbol delay exhibited by each of the delay devices 1201 and 1263 is close to one cycle delay of the artifact of the analog TV video carrier at 59.75 times the analog TV horizontal scan frequency $f_H$. The 12-symbol delay is close to five cycles of the artifact of the analog TV chrominance subcarrier at 287.25 times $f_H$. The 12-symbol delay is close to six cycles of the artifact of the analog TV sound carrier at 345.75 times $f_H$. This is the reason that the differentially combined response of the subtractor 1202 to the audio carrier, to the video carrier and to frequencies close to chrominance subcarrier differentially delayed by the first delay device 1201 tends to have reduced co-channel interference. However, in portions of a video signal in which edges cross a horizontal scan line, the amount of correlation in the analog TV video signal at such distances in the horizontal spatial direction is quite low.

A species 1261 of the multiplexer 261 is controlled by a multiplexer control signal that is in its first state for twelve symbol epochs at the beginning of each data segment. At other times the multiplexer 1261 control signal is in its second state, provided there is no indication supplied during data slicing or the trellis decoding operations that a symbol decoding result used to form a particular one of the twelve interleaved trellis codes is very likely to have been corrupted. When such indication is supplied, particularly during the earlier portion of a data segment, the multiplexer control signal can be placed into its first state the twelfth following symbol epoch. This will help forestall long running errors that are characteristic of differential coding schemes.

Figure 3:
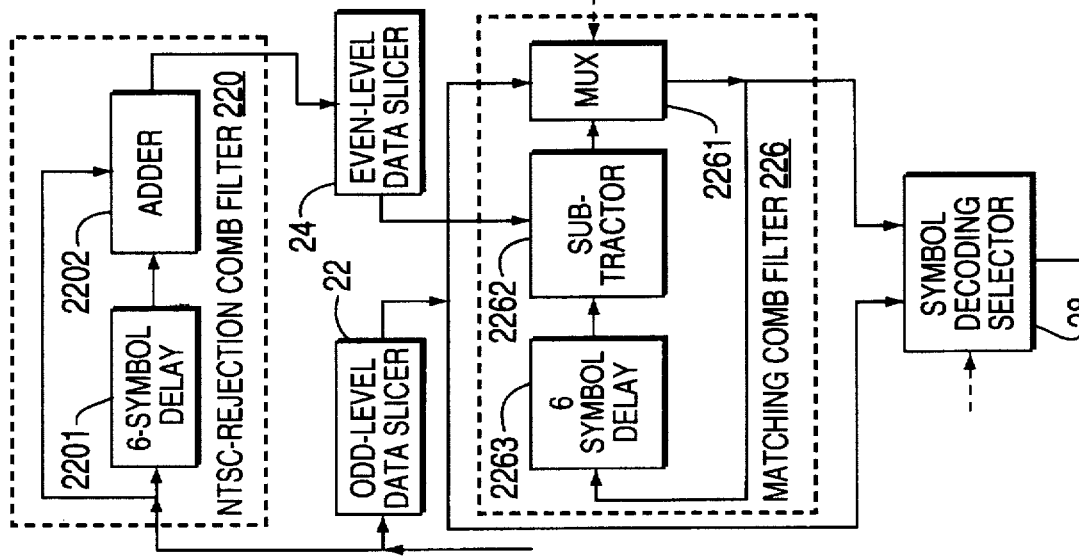
FIG. 3 is a block schematic diagram showing details of a portion of the FIG. 1 digital television signal receiver when the NTSC-rejection comb filter employs a 6-symbol delay.

FIG. 3 is a block schematic diagram showing details of a portion of the FIG. 1 digital television signal receiver using a species 220 of the NTSC-rejection comb filter 20 and a species 226 of the matching comb filter 26. The NTSC-rejection comb filter 220 uses a first delay device 2201 exhibiting a delay of six symbol epochs, and the matching comb filter 226 uses a second delay device 2263 also exhibiting a delay of six symbol epochs. The 6-symbol delay exhibited by each of the delay devices 2201 and 2263 is close to 0.5 cycle delay of the artifact of the analog TV video carrier at 59.75 times the analog TV horizontal scan frequency $f_H$, close to 2.5 cycles of the artifact of the analog TV chrominance subcarrier at 287.25 times $f_H$, and close to 3 cycles of any artifact of the analog TV audio carrier at 345.75 times $f_H$. An adder 2202 serves as the first linear combiner in the NTSC-rejection comb filter 220, and a modulo-8 subtractor 2262 serves as the second linear combiner in the matching comb filter 226. Since the delay exhibited by the delay devices 2201 and 2263 is shorter than the delay exhibited by the delay devices 1201 and 1263, although nulls near frequencies converted from analog TV carrier frequencies are narrower band, there is more likely to be good anti-correlation in the signals additively combined by the adder 2202 than there is likely to be good correlation in the signals differentially combined by the subtractor 1202. The suppression of the sound carrier is poorer in the NTSC-rejection comb filter 220 response than in the NTSC-rejection comb filter 120 response. However, if the sound carrier of a co-channel interfering analog TV signal has been suppressed by SAW filtering or a sound trap in the "front end" electronics 10, the poor sound rejection of the comb filter 220 is not a problem. The responses to sync tips is reduced in duration using the NTSC-rejection comb filter 220 of FIG. 3 rather than the NTSC-rejection comb filter 120 of FIG. 2, so there is substantially reduced tendency to overwhelm error-correction in the trellis decoding and Reed-Solomon coding.

A species 2261 of the multiplexer 261 is controlled by a multiplexer control signal that is in its first state for six symbol epochs at the beginning of each data segment. At other times the multiplexer 2261 control signal is in its second state, provided there is no indication supplied during data slicing or the trellis decoding operations that a symbol decoding result is very likely to have been corrupted. When such indication is supplied, particularly during the earlier portion of a data segment, the multiplexer control signal can be placed into its first state the sixth following symbol epoch. This will help forestall long running errors that are characteristic of differential coding schemes.

Figure 4:
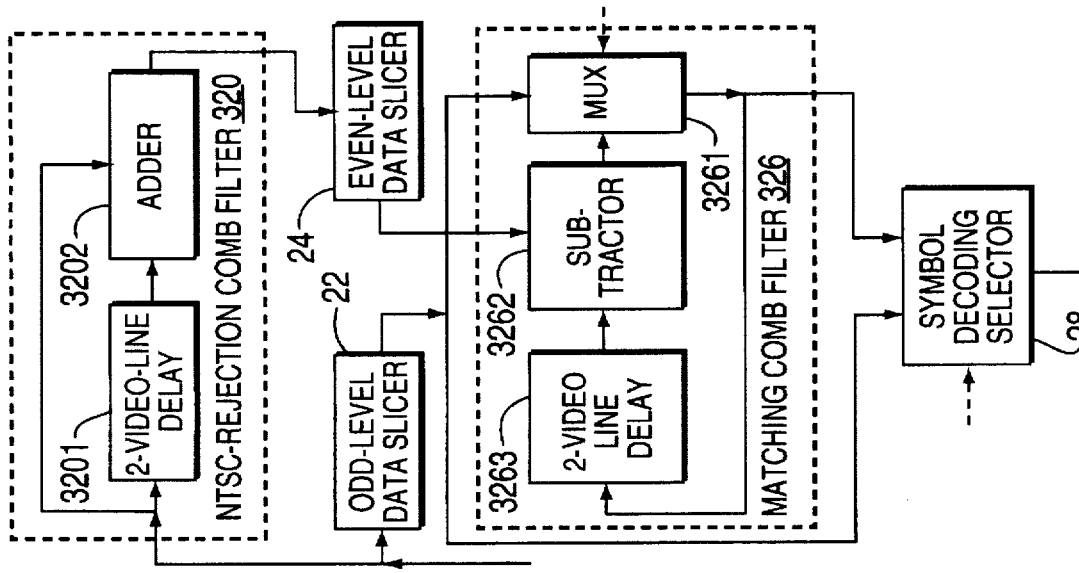
FIG. 4 is a block schematic diagram showing details of a portion of the FIG. 1 digital television signal receiver when the NTSC-rejection comb filter employs a 2-video-line delay.

FIG. 4 is a block schematic diagram showing details of a portion of the FIG. 1 digital television signal receiver using a species 320 of the NTSC-rejection comb filter 20 and a species 326 of the matching comb filter 26. The NTSC-rejection comb filter 320 uses a first delay device 3201 exhibiting a delay of 1368 symbol epochs, which delay is substantially equal to the duration of two horizontal scan lines of an analog TV signal, and the matching comb filter 326 uses a second delay device 3263 also exhibiting such delay. The first linear combiner in the NTSC-rejection comb filter 320 is an adder 3202, and the second linear combiner in the matching comb filter 326 is a modulo-8 subtractor 3262. A species 3261 of the multiplexer 261 is controlled by a multiplexer control signal that is in its first state during a portion of the first data segment in each data field, which portion is known a priori at the DTV receiver. The symbol codes applied as input signal to the delay device 3261 device during this portion of the first data segment in each data field can be corrected when necessary. At other times the multiplexer 3261 control signal is in its second state, provided there is no indication supplied during data slicing or the trellis decoding operations that a symbol decoding result is very likely to have been corrupted. When such indication is supplied, particularly during the earlier portion of a data field, the multiplexer control signal can be placed into its first state the 1368th following symbol epoch. This will help forestall long running errors that are characteristic of differential coding schemes.

The FIG. 4 NTSC-rejection comb filter 320 is quite good in suppressing demodulation artifacts generated in response to analog TV horizontal synchronizing pulses, as well as suppressing many of the demodulation artifacts generated in response to analog TV vertical synchronizing pulses and equalizing pulses. These artifacts are the co-channel interference with highest energy. Except where there is scan-line-to-scan-line change in the video content of the analog TV signal over the period of two scan lines, the NTSC-rejection comb filter 320 provides reasonably good suppression of that video content regardless of its color. The suppression of the FM audio carrier of the analog TV signal is reasonably good, in case it has not been suppressed by a tracking rejection filter in the symbol synchronization and equalization circuitry 16. Artifacts of most analog TV color bursts are suppressed in the NTSC-rejection comb filter 320 response, too. Furthermore, the filtering provided by the NTSC-rejection comb filter 320 is "orthogonal" to the NTSC-interference rejection built into the trellis decoding procedures.

A modification that can be made to the portion of the FIG. 1 digital television signal receiver shown in FIG. 64is to replace the multiplexer 3261 with a three-input multiplexer permitting correct symbol codes for the portion of the first data segment in each data field known a priori at the DTV receiver to be selected from a memory in the DTV receiver.

Figure 5:
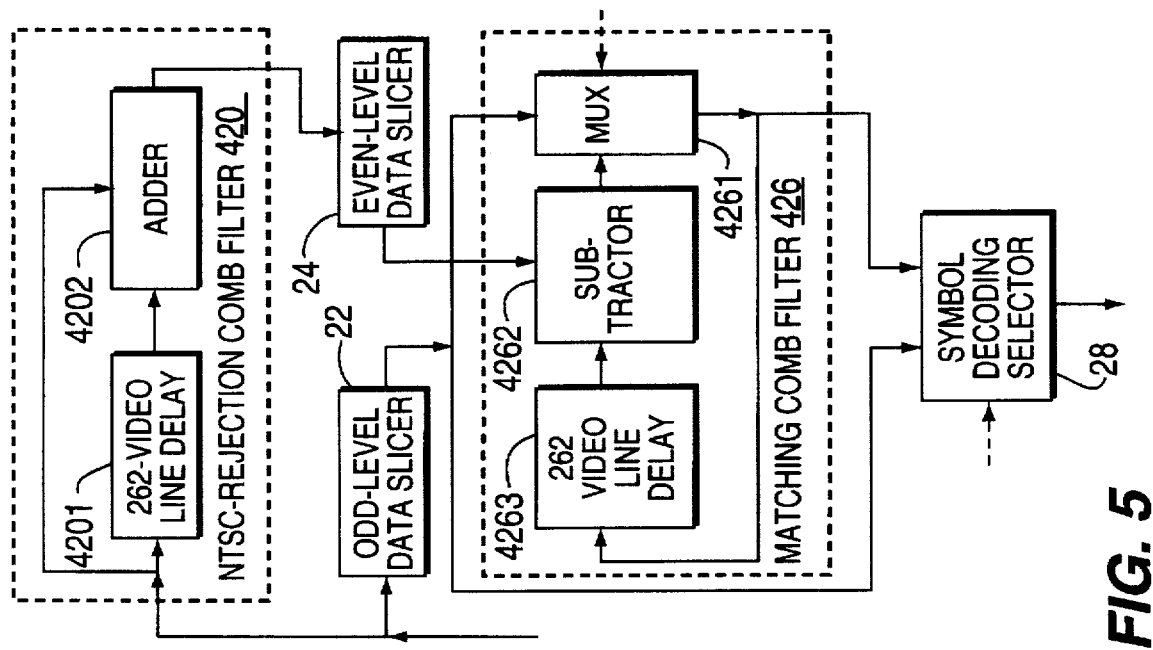
FIG. 5 is a block schematic diagram showing details of a portion of the FIG. 1 digital television signal receiver when the NTSC-rejection comb filter employs a 262-video-line delay.

FIG. 5 is a block schematic diagram showing details of a portion of the FIG. 1 digital television signal receiver using a species 420 of the NTSC-rejection comb filter 20 and a species 426 of the matching comb filter 26. The NTSC-rejection comb filter 420 uses a first delay device 4201 exhibiting a delay of 179,208 symbol epochs, which delay is substantially equal to the period of 262 horizontal scanning lines of an analog TV signal, and the matching comb filter 426 uses a second delay device 4261 also exhibiting such delay. An adder 4202 serves as the first linear combiner in the NTSC-rejection comb filter 420, and a modulo-8 subtractor 4262 serves as the second linear combiner in the matching comb filter 426.

A species 4261 of the multiplexer 461 is controlled by a multiplexer control signal that is in its first state when field-to-field motion for an analog TV pixel associated with the current symbol epoch is detected. At other times the multiplexer 4261 control signal is in its second state, provided there is no indication supplied during data slicing or the trellis decoding operations that a symbol decoding result is very likely to have been corrupted. When such indication is supplied a prescribed number of times, the multiplexer control signal can be placed into its first state the 179,208th following symbol epoch. This will help forestall plural-frame running errors for each particular analog TV pixel. Indications of error can also be generated during a portion of the first data segment in each data field, which portion is known a priori at the DTV receiver, and the symbol codes applied as input signal to the delay device by the second delay device 4261 can be corrected when necessary.

The FIG. 5 NTSC-rejection comb filter 420 suppresses most demodulation artifacts generated in response to analog TV vertical synchronizing pulses and equalizing pulses, as well as suppressing all the demodulation artifacts generated in response to analog TV horizontal synchronizing pulses. These artifacts are the co-channel interference with highest energy. Also, the NTSC-rejection comb filter 420 suppresses artifacts arising from the video content of the analog TV signal that does not change from field to field or line-to-line, getting rid of stationary patterns irrespective of their horizontal spatial frequency or color. Artifacts of most analog TV color bursts are suppressed in the NTSC-rejection comb filter 420 response, too.

Figure 6:
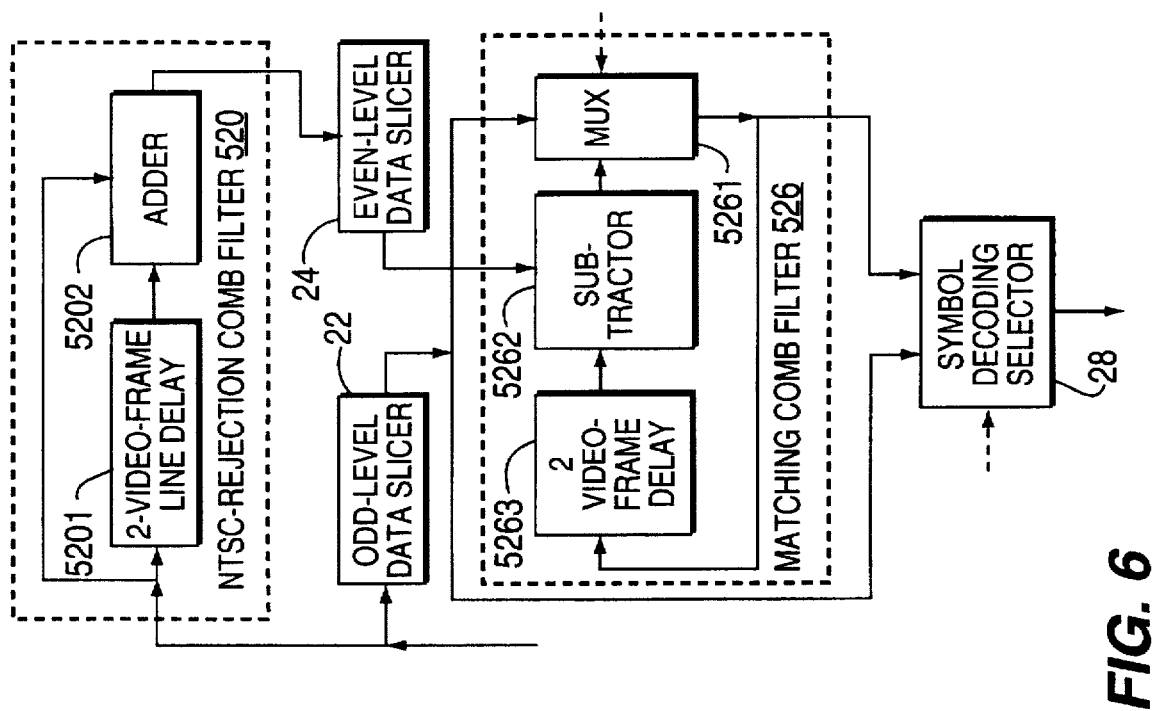
FIG. 6 is a block schematic diagram showing details of a portion of the FIG. 1 digital television signal receiver when the NTSC-rejection comb filter employs a 2-video-frame delay.

FIG. 6 is a block schematic diagram showing details of a portion of the FIG. 1 digital television signal receiver using a species 520 of the NTSC-rejection comb filter 20 and a species 526 of the matching comb filter 26. The NTSC-rejection comb filter 520 uses a first delay device 5201 exhibiting a delay of 718,200 symbol epochs, which delay is substantially equal to the period of two frames of an analog TV signal, and the matching comb filter 526 uses a second delay device 5261 also exhibiting such delay. An adder 5202 serves as the first linear combiner in the NTSC-rejection comb filter 520, and a modulo-8 subtractor 5262 serves as the second linear combiner in the matching comb filter 526.

A species 5261 of the multiplexer 261 is controlled by a multiplexer control signal that is in its first state when frame-to-frame motion for an analog TV pixel associated with the current symbol epoch is detected. At other times the multiplexer 5261 control signal is in its second state, provided there is no indication supplied during data slicing or the trellis decoding operations that a symbol decoding result is very likely to have been corrupted. When such indication is supplied a prescribed number of times, the multiplexer control signal can be placed into its first state the 718,200th following symbol epoch. This will help forestall plural-frame running errors for each particular analog TV pixel. Indications of error can also be generated during a portion of the first data segment in each data field, which portion is known a priori at the DTV receiver, and the symbol codes applied as input signal to the delay device by the second delay device 5261 can be corrected when necessary.

The FIG. 6 NTSC-rejection comb filter 520 suppresses all demodulation artifacts generated in response to analog TV vertical synchronizing pulses and equalizing pulses, as well as suppressing all the demodulation artifacts generated in response to analog TV horizontal synchronizing pulses. These artifacts are the co-channel interference with highest energy. Also, the NTSC-rejection comb filter 520 suppresses artifacts arising from the video content of the analog TV signal that does not change over two frames, getting rid of such very stationary patterns irrespective of their spatial frequency or color. Artifacts of all analog TV color bursts are suppressed in the NTSC-rejection comb filter 520 response, too.

One skilled in the art of television system design will discern other properties of correlation and anti-correlation in analog TV signals that can be exploited in the design of NTSC-rejection filters of still other types than those shown in FIGS. 2. The use of NTSC-rejection filters that cascade two NTSC-rejection filters of the types already disclosed increases the 2N levels of the baseband signals to (8N−1) data levels. Such filters may be required to overcome particularly bad co-channel interference problems despite their shortcoming of reducing signal-to-noise for random noise interference with symbol decoding.

FIG. 7 shows a modification of a digital television signal receiver as thusfar described, constructed in accordance with a further aspect of the invention so as to utilize a plurality of symbol decoders operated in parallel, each preceded by a respective NTSC-rejection comb filter and succeeded by a matching comb filter. The prefixes A, B and C in the identification numbers for the elements of FIG. 9 are different integers which will correspond to respective ones of the integers 1, 2, 3, 4 and 5 when receiver portions as shown in ones of FIGS. 2–6 are employed. The symbol decoding selector 28 that has no decision-making capability of its own is replaced with symbol decoding selection circuitry 028. The symbol decoding selection circuitry 028 has decision-making capability of its own and supplies a best estimate of correct symbol decoding for application to the trellis decoding circuitry 34.

A co-channel interference detector A00 of a first type determines whether co-channel interference from an analog TV signal is such that a first NTSC-rejection filter A20 of a first type will be effective in reducing that interference substantially. The co-channel interference detector A00 includes a first NTSC-extraction comb filter having a comb filter characteristic complementary to the first NTSC-rejection filter A20. The first NTSC-extraction comb filter is arranged to respond to the baseband I-channel signal, and the response of that filter is cored to remove signal excursions within the expected range for symbol levels. The energy of the cored response is then measured to generate an indication to of how effective the NTSC-rejection filter A20 of first type will be in reducing current co-channel interference, which indication is supplied from the co-channel interference detector A00 to the symbol decoding selection circuitry 028.

A co-channel interference detector B00 of a second type determines whether co-channel interference from an analog TV signal is such that a NTSC-rejection filter B20 of second type will be effective in reducing that interference substantially. The co-channel interference detector B00 includes a second NTSC-extraction comb filter having a comb filter characteristic complementary to the NTSC-rejection filter B20. The second NTSC-extraction comb filter is arranged to respond to the baseband I-channel signal and the response of that filter is cored to remove signal excursions within the expected range for symbol levels. The energy of the cored response is then measured to generate an indication to of how effective the NTSC-rejection filter B20 of second type will be in reducing current co-channel interference, which indication is supplied from the co-channel interference detector B00 to the symbol decoding selection circuitry 028.

A co-channel interference detector C00 of a third type determines whether co-channel interference from an analog TV signal is such that a NTSC-rejection filter C20 of third type will be effective in reducing that interference substantially. The co-channel interference detector C00 includes a third NTSC-extraction comb filter having a comb filter characteristic complementary to the NTSC-rejection filter C20. The third NTSC-extraction comb filter is arranged to respond to the baseband I-channel signal and the response of that filter is cored to remove signal excursions within the expected range for symbol levels. The energy of the cored response is then measured to generate an indication to of how effective the NTSC-rejection filter 320 of third type will be in reducing current co-channel interference, which indication is supplied from the co-channel interference detector C00 to the symbol decoding selection circuitry 028.

The odd-level data-slicer 22 supplies interim symbol decoding results to a matching comb filter A26 of a first type, to a matching comb filter B26 of a second type, and to a matching comb filter C26 of a third type. An even-level data-slicer A24 converts the response of the NTSC-rejection filter A20 to first supplemental symbol decoding results for application to the matching comb filter A26. An even-level data-slicer B24 converts the response of the NTSC-rejection filter B20 to second supplemental symbol decoding results for application to the matching comb filter B26. An even-level data-slicer C24 converts the response of the NTSC-rejection filter C20 to third supplemental symbol decoding results for application to the matching comb filter C26.

The symbol decoding selector 028 includes voting circuitry for polling the symbol codes supplied from the odd-level data slicer 22, the matching comb filter A26 of first type, the matching comb filter B26 of second type, and the matching comb filter C26 of third type. If all four of the symbol decoding results concur, the symbol decoding result concurred to is supplied to the trellis coder circuitry 34. If the symbol decoding results supplied from the odd-level data slicer 22, the matching comb filter A26 of first type, the matching comb filter B26 of second type, and the matching comb filter C26 of third type do not concur a simple voting procedure can be carried out by the voting circuitry to select the decoding result least likely to be in error.

More accurate symbol decoding will be obtained more of the time if a weighted voting procedure is followed in the voting circuitry. The weights for voting can be determined solely from the indications supplied from the co-channel interference detectors A00, B00 and C00. This avoids the need for replicating the trellis decoder circuitry 34. This procedure can be modified to take into account the variances of the decoding results, reducing the weight accorded a decoding result in the voting procedure if it departs from a decoding result concurred in by a majority of the other symbol decoding circuits.

The trellis decoder circuitry 34 may be replicated and the relative success of various symbol decoding decisions can be compared to refine the best estimate of symbol decoding result further. This involves considerably more digital hardware, however.

The best estimate of symbol decoding results are used to correct the summation procedures in the matching comb filters A26, B26 and C26 in variants of the FIG. 7 digital receiver apparatus constructed in accordance with still further aspects of the invention.

The FIG. 7 digital receiver apparatus is modified in yet other embodiments of the invention to use additional parallel data-slicing operations, each carried out by a cascade connection of respective NTSC-rejection filter followed by a respective even-level data slicer followed by a respective matching comb filter. Each additional NTSC-rejection filter is provided an additional co-channel interference detector for determining whether co-channel interference from an analog TV signal is currently such that the NTSC-rejection filter will be effective in suppressing it. While two additional parallel data-slicing operations are shown in FIG. 7, modifications to use still further parallel data-slicing operations can provide capability for refining the best estimate of correct symbol decoding result still further.

The NTSC-rejection comb filter A20 and the matching comb filter A26 circuitry are advantageously chosen to be of types like the NTSC-rejection comb filter 320 and the matching comb filter 326 circuitry of FIG. 6. The NTSC-extraction comb filter A00 then comprises a delay device for differentially delaying the equalized baseband I-channel signal by 718,200 symbol epochs and an subtractor for linearly combining the differentially delayed equalized baseband I-channel signal. (From the standpoint of minimizing digital hardware, the delay device preferably is the delay device 3201 put to dual use.) The high-energy demodulation artifacts generated in response to analog TV synchronizing pulses, equalizing pulses, and color bursts are all suppressed when the NTSC-rejection comb filter A20 additively combines alternate video frames. Also, artifacts arising from the video content of the analog TV signal that does not change over two frames are suppressed, getting rid of stationary patterns irrespective of their spatial frequency or color.

The remaining problem of suppressing demodulation artifacts primarily concerns suppressing those demodulation artifacts arising from frame-to-frame difference at certain pixel locations within the analog TV signal raster. These demodulation artifacts can be suppressed by intra-frame filtering techniques. The NTSC-rejection comb filter B20 and the matching comb filter B26 circuitry can be chosen to suppress remnant demodulation artifacts by relying on correlation in the horizontal direction, and the NTSC-rejection comb filter C20 and the matching comb filter C26 circuitry can be chosen to suppress remnant demodulation artifacts by relying on correlation in the vertical direction. Consider how such a design decision can be further implemented.

If the sound carrier of a co-channel interfering analog TV signal has not been suppressed by SAW filtering or a sound trap in the "front end" electronics 10, the NTSC-rejection comb filter B20 and the matching comb filter B26 circuitry are advantageously chosen to be of types like the NTSC-rejection comb filter 120 and the matching comb filter 126 circuitry of FIG. 2. The NTSC-extraction comb filter B00 then comprises a delay device for differentially delaying the equalized baseband I-channel signal by twelve symbol epochs and an adder for linearly combining the differentially delayed equalized baseband I-channel signal.

If the sound carrier of a co-channel interfering analog TV signal has been suppressed by SAW filtering or a sound trap in the "front end" electronics 10, the NTSC-rejection comb filter B20 and the matching comb filter B26 circuitry are advantageously chosen to be of types like the NTSC-rejection comb filter 220 and the matching comb filter 226 circuitry of FIG. 3. The NTSC-extraction comb filter B00 then comprises a delay device for differentially delaying the equalized baseband I-channel signal by six symbol epochs and a subtractor for linearly combining the differentially delayed equalized baseband I-channel signal.

The optimal choice of the NTSC-rejection comb filter C20 and the matching comb filter C26 circuitry is less straightforward, because of the choice one must make (in consideration of field interlace in the interfering analog TV signal) whether to choose the temporally closer scan line in the same field or the spatially closer line in the preceding field to be combined with the current scan line in the NTSC-rejection comb filter C20. Choosing the temporally closer scan line in the same field is generally the better choice, since jump cuts between fields are less likely to ravage NTSC rejection by the comb filter C20. With such choice, the NTSC-rejection comb filter C20 and the matching comb filter C26 circuitry are of types like the NTSC-rejection comb filter 320 and the matching comb filter 326 circuitry of FIG. 4. With the other choice instead, the NTSC-rejection comb filter C20 and the matching comb filter C26 circuitry are of types like the NTSC-rejection comb filter 420 and the matching comb filter 426 circuitry of FIG. 5.

The FIG. 7 digital receiver apparatus is modified in yet other embodiments of the invention to use additional parallel data-slicing operations. This allows the NTSC-rejection comb filter C20 and the matching comb filter C26 circuitry to be of types like the NTSC-rejection comb filter 320 and the matching comb filter 326 circuitry of FIG. 4, for example, while still allowing the use of a further NTSC-rejection comb filter and further matching comb filter circuitry of types like the NTSC-rejection comb filter 420 and the matching comb filter 426 circuitry of FIG. 5.

One skilled in the art of digital communications receiver design and acquainted with the foregoing specification and its drawing will be enabled to design many embodiments of the invention other than the preferred ones specifically described. This should be borne in mind when construing the scope of the broader claims which follow. In the claims which follow, the word "said" is used whenever reference is made to an antecedent, and the word "the" is used for grammatical purposes other than to refer back to an antecedent.

What is claimed is:

1. A method of symbol decoding a stream of 2N-level symbols each having a symbol epoch of a specified length in time, which said stream of 2N-level symbols is susceptible to being accompanied by artifacts of co-channel interfering analog television signal, said method generating final symbol decoding results and comprising the steps of:

comb filtering said stream of 2N-level symbols to generate a comb filter response with (4N−1)-level symbols from which any said artifacts of co-channel interfering analog television signal are suppressed, said step of comb filtering including substeps of delaying said stream of 2N-level symbols by a prescribed number of said symbol epochs to generate a delayed stream of 2N-level symbols and linearly combining said stream of 2N-level symbols and said delayed stream of 2N-level symbols, in an addition procedure for generating first linear combining results as said comb filter response with (4N−1)-level symbols;

data-slicing said stream of 2N-level symbols to generate interim symbol decoding results;

data-slicing said comb filter response with (4N−1)-level symbols to generate supplemental symbol decoding results;

delaying selected symbol decoding results by a prescribed number of said symbol epochs to generate delayed selected symbol decoding results;

linearly combining said supplemental symbol decoding results with said delayed selected symbol decoding results, in accordance with a subtraction procedure carried out in a modulo-2N arithmetic for generating second linear combining results;

selecting said interim symbol decoding results to be said selected symbol decoding results at prescribed times and otherwise selecting said second linear combining results to be said selected symbol decoding results;

determining when said stream of 2N-level symbols is currently accompanied by artifacts of co-channel interfering analog television signal of sufficient strength that said selected symbol decoding results are less likely to be in error than said interim symbol decoding results and when said stream of 2N-level symbols is not currently accompanied by artifacts of co-channel interfering analog television signal of sufficient strength that said selected symbol decoding results are less likely to be in error than said interim symbol decoding results;

choosing said interim symbol decoding results as said final decoding results, responsive to it being determined said stream of 2N-level symbols is not currently accompanied by artifacts of co-channel interfering analog television signal of sufficient strength that said selected symbol decoding results are less likely to be in error than said interim symbol decoding results; and choosing said selected symbol decoding results as said final decoding results, responsive to it being determined said stream of 2N-level symbols is currently accompanied by artifacts of co-channel interfering analog television signal of sufficient strength that said selected symbol decoding results are less likely to be in error than said interim symbol decoding results.

2. The method of symbol decoding set forth in claim 1, wherein said prescribed number of said symbol epochs is six.

3. The method of symbol decoding set forth in claim 1, wherein said prescribed number of said symbol epochs is substantially equal to the duration of two horizontal scanning lines of said co-channel interfering analog television signal.

4. The method of symbol decoding set forth in claim 1, wherein said prescribed number of said symbol epochs is substantially equal to the duration of two hundred sixty-two horizontal scanning lines of said co-channel interfering analog television signal.

5. The method of symbol decoding set forth in claim 1, wherein said prescribed number of said symbol epochs is substantially equal to the duration of two video frames of said co-channel interfering analog television signal.

6. In combination:

digital television signal detection apparatus for supplying a stream of 2N-level symbols each having a symbol epoch of a specified length in time, which stream is susceptible to being accompanied by artifacts of co-channel interfering analog television signal;

a first data slicer decoding said stream of 2N-level symbols for generating interim symbol decoding results;

a first delay device for exhibiting a delay of a prescribed first number of said symbol epochs, connected to respond to said stream of 2N-level symbols with a first delayed stream of 2N-level symbols, thereby to generate a first pair of differentially delayed streams of said 2N-level symbols;

a first linear combiner which in an addition process linearly combines said first pair of differentially delayed streams of said 2N-level symbols susceptible to being accompanied by artifacts of co-channel interfering analog television signal, received as first and second respective input signals of said first linear combiner, to generate a first stream of (4N−1)-level symbols as an output signal of said first linear combiner, said first stream of (4N−1)-level symbols providing a first comb filter response in which said artifacts of co-channel interfering analog television signal are suppressed;

a second linear combiner which in a subtraction process carried out in accordance with a modulo-2N arithmetic linearly combines respective first and second input signals received thereby for supplying a respective output signal therefrom;

a second data slicer decoding said first stream of (4N−1)-level symbols supplied as respective output signal from said first linear combiner, for generating first supplemental symbol decoding results applied to said second linear combiner as said respective first input signal thereof, a two-input first multiplexer receiving said interim symbol decoding results as a first input signal thereto, receiving the output signal from said second linear combiner as a second input signal thereto, and reproducing as an output signal therefrom one of its said first and said second input signals as selected in response to a first multiplexer control signal;

a second delay device connected for delaying the output signal of said first multiplexer said prescribed first number of symbol epochs to generate said second input signal of said second linear combiner; and symbol decoding selector circuitry for supplying final symbol decoding results, as selected from estimated symbol decoding results, said estimated symbol decoding results including said interim symbol decoding results and further including said output signal from said first multiplexer.

7. The combination of claim 6, wherein said prescribed first number of symbol epochs is six.

8. The combination of claim 6, wherein said prescribed first number of symbol epochs is substantially equal to the number of symbol epochs in two horizontal scan lines of said co-channel interfering analog television signal.

9. The combination of claim 8, wherein said prescribed first number of symbol epochs is one-thousand three hundred sixty-eight.

10. The combination of claim 6, wherein said prescribed first number of symbol epochs is substantially equal to the number of symbol epochs in two hundred sixty-two horizontal scan lines of said co-channel interfering analog television signal.

11. The combination of claim 10, wherein said prescribed first number of symbol epochs is one hundred seventy-nine thousand two hundred eight.

12. The combination of claim 6, wherein said prescribed first number of symbol epochs is substantially equal to the number of symbol epochs in two video frames of said co-channel interfering analog television signal.

13. The combination of claim 6, wherein said prescribed first number of symbol epochs is seven hundred eighteen thousand two hundred.

14. The combination of claim 6, further comprising:

a co-channel interference detector connected for generating an indication of when said stream of 2N-level symbols supplied from said digital television signal detection apparatus is accompanied by artifacts of co-channel interfering analog television signal that can be suppressed in said first comb filter response and that are of a significant energy level strong enough to interfere with said first data slicer decoding said stream of 2N-level symbols, said indication being supplied to said symbol decoding selector circuitry, said symbol decoding selector circuitry selecting said interim symbol decoding results as said final symbol decoding results only if said co-channel interference detector does not generate a current indication that said stream of 2N-level symbols supplied from said digital television signal detection apparatus is accompanied by said artifacts of co-channel interfering analog television signal that can be suppressed in said first comb filter response and that are of said significant energy level.

15. The combination of claim 6, further comprising:

a second delay device for exhibiting a delay of a prescribed second number of said symbol epochs, connected to respond to said stream of 2N-level symbols with a second delayed stream of 2N-level symbols, thereby to generate a second pair of differentially delayed streams of said 2N-level symbols;

a third linear combiner which linearly combines said second pair of differentially delayed streams of said 2N-level symbols susceptible to being accompanied by artifacts of co-channel interfering analog television signal, received as first and second respective input signals of said third linear combiner, to generate a second stream of (4N−1)-level symbols as an output signal of said third linear combiner, said second stream of (4N−1)-level symbols providing a second comb filter response in which said artifacts of co-channel interfering analog television signal are suppressed;

a fourth linear combiner which linearly combines respective first and second input signals received thereby for supplying a respective output signal therefrom, one of said third and said fourth linear combiners being an adder and the other of said first and said second linear combiners being a subtractor;

a third data slicer decoding said second stream of (4N−1)-level symbols supplied as respective output signal from said third linear combiner, for generating second supplemental symbol decoding results applied to said fourth linear combiner as said respective first input signal thereof;

a two-input second multiplexer receiving said interim symbol decoding results as a first input signal thereto, receiving the output signal from said fourth linear combiner as a second input signal thereto, and reproducing as an output signal therefrom one of its said first and said second input signals as selected in response to a second multiplexer control signal, said output signal of said second multiplexer being supplied to said symbol decoding selector as a further one of said estimated symbol decoding results; and a fourth delay device connected for delaying the output signal of said second multiplexer said prescribed second number of symbol epochs to generate said second input signal of said fourth linear combiner.

16. In combination:

digital television signal detection apparatus for supplying a stream of 2N-level symbols each having a symbol epoch of a specified length in time, which stream of 2N-level symbols is susceptible to being accompanied by artifacts of co-channel interfering analog television signal;

a first data slicer decoding said stream of 2N-level symbols for generating interim symbol decoding results;

a first delay device for exhibiting a delay of a prescribed first number of said symbol epochs, connected to respond to said stream of 2N-level symbols with a first delayed stream of 2N-level symbols, thereby to generate a pair of differentially delayed streams of said 2N-level symbols; and an adder for adding said pair of differentially delayed streams of said 2N-level symbols susceptible to being accompanied by artifacts of co-channel interfering analog television signal, received as first and second respective input signals of said adder, for supplying as a sum output signal a stream of (4N−1)-level symbols in which said accompanying artifacts of co-channel interfering analog television signal will be suppressed.

17. The combination of claim 16, wherein said prescribed first number of symbol epochs is six.

18. The combination of claim 16, wherein said prescribed first number of symbol epochs is substantially equal to the number of symbol epochs in two horizontal scan lines of said co-channel interfering analog television signal.

19. The combination of claim 16, wherein said prescribed first number of symbol epochs is one-thousand three hundred sixty-eight.

20. The combination of claim 16, wherein said prescribed first number of symbol epochs is substantially equal to the number of symbol epochs in two hundred sixty-two horizontal scan lines of said co-channel interfering analog television signal.

21. The combination of claim 16, wherein said prescribed first number of symbol epochs is one hundred seventy-nine thousand two hundred eight.

22. The combination of claim 16, wherein said prescribed first number of symbol epochs is substantially equal to the number of symbol epochs in two video frames of said co-channel interfering analog television signal.

23. The combination of claim 16, wherein said prescribed first number of symbol epochs is seven hundred eighteen thousand two hundred.

24. The combination of claim 16, further comprising:

a subtractor for differentially combining in accordance with a modulo-2N arithmetic respective first and second input signals received thereby for supplying a respective output signal therefrom;

a second data slicer decoding said stream of (4N−1)-level symbols supplied as respective output signal from said adder, for generating first supplemental symbol decoding results applied to said subtractor as said first input signal thereof;

multiplexer circuitry reproducing as an output signal therefrom one of a plurality of input signals as selected in response to a multiplexer control signal, said multiplexer circuitry receiving said interim symbol decoding results as a first input signal thereto and receiving the output signal from said subtractor as a second input signal thereto, and the output signal from said multiplexer circuitry being used to provide final symbol decoding results; and a second delay device connected for delaying the output signal of said multiplexer circuitry by said prescribed first number of symbol epochs to generate said second input signal of said subtractor.

25. The combination of claim 24, wherein said prescribed first number of symbol epochs is six.

26. The combination of claim 24, wherein said prescribed first number of symbol epochs is substantially equal to the number of symbol epochs in two horizontal scan lines of said co-channel interfering analog television signal.

27. The combination of claim 24, wherein said prescribed first number of symbol epochs is one-thousand three hundred sixty-eight.

28. The combination of claim 24, wherein said prescribed first number of symbol epochs is substantially equal to the number of symbol epochs in two hundred sixty-two horizontal scan lines of said co-channel interfering analog television signal.

29. The combination of claim 24, wherein said prescribed first number of symbol epochs is one hundred seventy-nine thousand two hundred eight.

30. The combination of claim 24, wherein said prescribed first number of symbol epochs is substantially equal to the number of symbol epochs in two video frames of said co-channel interfering analog television signal.

31. The combination of claim 24, wherein said prescribed first number of symbol epochs is seven hundred eighteen thousand two hundred.

* * * * *